Nov. 20, 1962  R. E. CHEVALIER  3,064,930
ROLL CONTROL SURFACES
Filed April 7, 1960  2 Sheets-Sheet 1
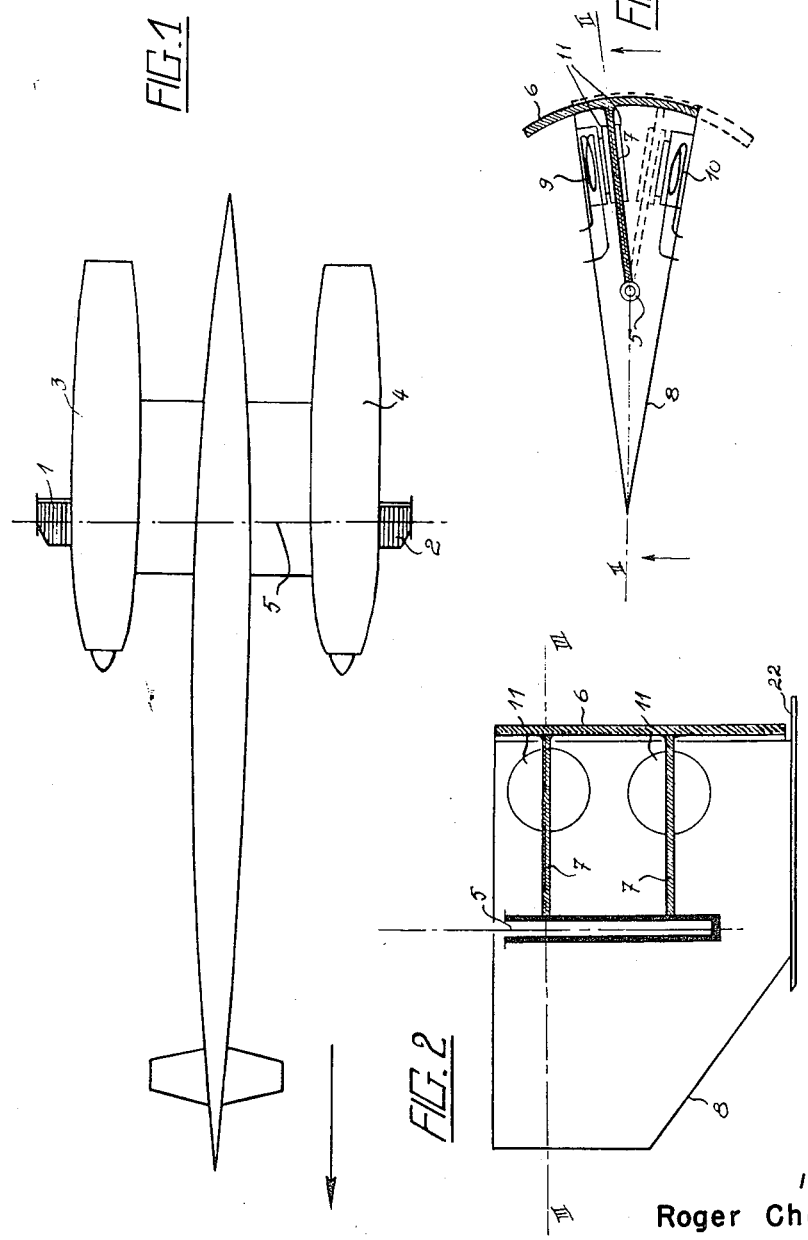
INVENTOR
Roger Chevalier
BY KARL W. FLOCKS
ATTORNEY

United States Patent Office 3,064,930
Patented Nov. 20, 1962

3,064,930
ROLL CONTROL SURFACES
Roger E. Chevalier, Paris, France, assignor to Nord-Aviation, Societe Nationale de Constructions Aeronautiques, Paris, France, a joint-stock company of France
Filed Apr. 7, 1960, Ser. No. 20,702
Claims priority, application France Sept. 8, 1959
5 Claims. (Cl. 244—77)

The present invention relates to roll control surfaces adapted to equip aerodynes containing a wing unit and comprising a nacelle at each lateral extremity of the wing unit, which nacelle may be an engine-nacelle, a reservoir, a container etc.

The object is to provide for the stabilization and control of a rolling aerodyne by way of control-surfaces which, while being highly efficient, occupy minimum space and maintain the best lift-drag ratio both in the wing-unit and fin without decreasing their rigidity in flexion or in torsion.

Each of the two control-surfaces according to the invention consist of the combination of a fixed wing member attached to one nacelle and a spoiler adapted to pivot beside the said nacelle between two extreme positions about an axis perpendicular to the plane of longitudinal symmetry of the aerodyne, and means for on-and-off controlling the pivoting of the spoilers of said roll control surfaces, the said fixed wing members being just upstream the said corresponding spoiler and symmetrical one with the other with respect to the said plane of symmetry, the pivoting axes of the spoilers containing the lift center of each said control surface and being located inside the said fixed wing member, in line with the neutral axis of the said wing unit, and the means for on-and-off controlling the pivoting of the spoilers causing the latter to displace simultaneously and inversely with respect to one another.

According to one preferred embodiment of the invention, each spoiler consists of a member of cylindrical surface connected to the axis of rotation by radial members, said member of cylindrical surface being disposed just downstream from a fixed wing member, the control mechanism for the spoiler lying inside the said fixed wing member.

Still in accordance with this preferred embodiment, the extremity of the fixed wing member opposite to the nacelle is provided with an end-panel, adapted to increase the panel effect.

The position of these spoilers is preferably controlled by an automatic pilot, which sets the desired angle of roll and sends a signal to a two-position relay, which signal is a function F of the angle of roll $\varphi$, the speed of roll $\varphi'$ and of the desired angle of roll $\varphi_0$.

$$F = \varphi + K\varphi' - \varphi_0$$

K being a carefully selected constant.

The following advantages are derived from the present invention:

The wing unit and fin keep their good streamlining; their construction is simplified and their rigidity in flexion and torsion can be easily increased;

The lever arm of the roll control surfaces is a maximum and their dimensions are accordingly minimum;

No twisting moment is introduced into the wing unit as the axis of the roll control surfaces is an extension of the neutral axis thereof;

All of the electric, hydraulic, pneumatic etc. control mechanism lies within the fixed wing member, the nacelle being traversed only by an electric cable or a hydraulic or pneumatic line;

The efficiency of the roll control surfaces is increased by a double panel effect owing to the presence of the nacelle at the wing-tip and of the additional panel terminating the fixed wing member;

These control-surfaces only require a minimum of power, each of them having a spoiler moving perpendicularly to the air flow;

The control mechanism is particularly simple as each spoiler can occupy only two positions.

Other features and advantages will become apparent from the following description of one preferred embodiment of the invention given with reference to the accompanying diagrammatic drawings in which:

FIGURE 1 is a plan view of a missile equipped with roll control surfaces according to the invention;

FIGURE 2 is a horizontal section to an enlarged scale of the roll control surface taken along the line II—II of FIGURE 3;

FIGURE 3 is a vertical section of the roll control surface, taken through line III—III of FIGURE 2.

Figure 4:
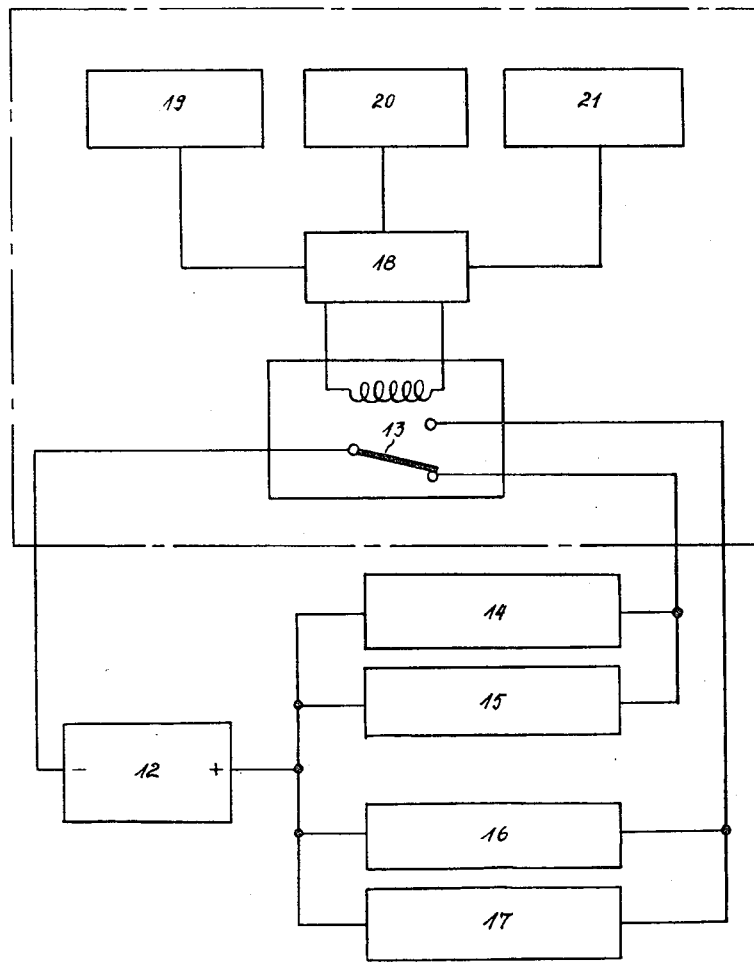
FIGURE 4 is a diagram of the control of the roll control surfaces from an automatic pilot.

In FIGURE 1, each of the roll control surfaces 1 and 2, comprising the spoiler and its fixed wing member, is disposed outside and against each of the wing-tip motor nacelles 3 and 4. The spoilers pivot about an axis which forms an extension of the neutral axis 5 of the wing unit.

In FIGURES 2 and 3, the spoiler consists of a member of cylindrical surface 6 fixed with respect to axis 5 by means of tubes 7.

The spoiler 6 is located downstream from the fixed wing member 8, through which passes the axis 5 and in which are housed a pair of electro-magnets 9 and 10. These latter act on the tubes 7 connecting spoiler 6 and its axis by attraction the magnetic plates 11.

The fixed wing member is closed on the outside by an end-panel 22.

In FIGURE 4, the battery 12, in accordance with the position of the relay 13, energizes either the winding 14 of the upper electromagnet of one fixed wing member and the winding 15 of the lower electromagnet of the other fixed wing member, or the winding 16 of the lower electromagnet of the first of the aforesaid fixed wing members and the winding 17 of the upper electromagnet of the other fixed wing member.

The relay 13 which can take up either of two positions is actuated by a signal supplied by the automatic pilot 18 comprising in particular a vertically acting gyroscope 19 giving the particular angle of roll $\varphi$ of the moment, a gyrometer 20 giving the instantaneous speed of the roll $\varphi'$, and a control 21 affecting the desired angle of roll $\varphi_0$. This signal is of the form:

$$F = \varphi + K\varphi' - \varphi_0$$

The operation of the roll control surfaces according to the invention will be readily apparent from the foregoing description. Each spoiler constantly oscillates about the angle of roll $\varphi_0$, the value of which can moreover be modified either by remote control, or by information supplied by a directional means adapted to direct the flight of the aerodyne along a given course. One of the extreme positions of spoiler 6 is shown in FIGURE 3 in full lines, and the other in dotted lines.

To the above-mentioned advantages can be added the ease of dismantling and the interchangeability of the roll control surfaces, and the accessibility of the fixed wing member and its control mechanism.

It is to be understood that the present invention has just been described and illustrated merely by way of explanation without intent of limitation and that numerous changes of detail can be made therein without falling outside its scope.

I claim:

1. On an aerodyne containing a wing unit with a nacelle located at each of the two lateral extremities of the said wing unit, two roll control surfaces, each said roll control-surface being located adjacent the said nacelle at a position opposed to the said wing unit and comprising the combination of a fixed wing member attached to one nacelle and a spoiler adapted to pivot beside the said nacelle between two extreme positions about an axis perpendicular to the plane of longitudinal symmetry of the aerodyne, and means for on-and-off controlling the pivoting of the spoilers of said roll control surfaces, the said fixed wing members being just upstream from the said corresponding spoiler and symmetrical one with the other with respect to the said plane of symmetry, the pivoting axes of the spoilers containing the lift center of each said control surface and being located inside the said fixed wing member, in line with the neutral axis of the said wing unit, and the means for on-and-off controlling the pivoting of the spoilers causing the latter to displace simultaneously and inversely with respect to one another.

2. Roll control surfaces in accordance with claim 1, wherein the said spoiler comprises a member having a surface conforming to the arc of a cylinder of revolution and radial members connecting the said cylindric surface to the said pivoting axis.

3. Roll control surfaces according to claim 1, wherein the said fixed wing member terminates laterally in a vertical end panel which is parallel to the plane of longitudinal symmetry of the aerodyne, whereby said vertical end panel increases the efficiency of the said roll control surface.

4. Roll control surfaces according to claim 1, wherein the means for on-and-off controlling the pivoting of the said spoilers of said roll surface members comprises two electromagnets located inside each of the two said fixed wing members on opposite sides of said radial members, an electric supply and a two-position relay, the said two-position relay being permanently connected to said electric supply and being adapted to connect said electric supply to the coil of the upper electromagnet of one of said fixed wing members and the coil of the lower electromagnet of the other said fixed wing member in one of the two positions of the said spoiler and to connect said electric supply to the coil of the lower electromagnet of the first-mentioned fixed wing member and the coil of the upper electromagnet of the second-mentioned fixed wing member in the other position of the said spoiler.

5. Roll control surfaces according to claim 4, wherein the said two-position relay is actuated by a signal supplied from an automatic pilot the direction of movement of the relay depending upon the sign of the signal said automatic pilot including a vertical gyroscope supplying the angle of roll $\varphi$, a gyrometer supply the instantaneous speed of the roll $\varphi'$ and a control affecting the desired angle of roll $\varphi_0$, the said signal being of the form:

$$F = \varphi + K\varphi' - \varphi_0$$

wherein K is a mathematical constant.

References Cited in the file of this patent

UNITED STATES PATENTS

| | | |
|---|---|---|
| 1,774,474 | Burnelli | Aug. 26, 1930 |
| 2,190,390 | Thiry | Feb. 13, 1940 |
| 2,827,250 | Rusler | Mar. 18, 1958 |
| 2,920,842 | Decker et al. | Jan. 12, 1960 |

FOREIGN PATENTS

| | | |
|---|---|---|
| 931,251 | France | Oct. 6, 1947 |
| 450,865 | Italy | Aug. 13, 1949 |